US006894680B1

(12) United States Patent
Sasaki et al.

(10) Patent No.: US 6,894,680 B1
(45) Date of Patent: May 17, 2005

(54) GROPING OPERATION APPARATUS

(75) Inventors: Eietsu Sasaki, Sagamihara (JP); Takaaki Adachi, Hino (JP); Miho Shibuya, Yokohama (JP)

(73) Assignee: Kabushiki Kaisha Kenwood, Tokyo (JP)

( * ) Notice: Subject to any disclaimer, the term of this patent is extended or adjusted under 35 U.S.C. 154(b) by 507 days.

(21) Appl. No.: 09/889,693

(22) PCT Filed: Nov. 27, 2000

(86) PCT No.: PCT/JP00/08343

§ 371 (c)(1),
(2), (4) Date: Jul. 20, 2001

(30) Foreign Application Priority Data

Nov. 25, 1999 (JP) .......................... 11-334367

(51) Int. Cl.⁷ ................................. G09G 5/00
(52) U.S. Cl. ................... 345/173; 345/179; 178/18.01; 178/19.02
(58) Field of Search ............................. 345/173, 174, 345/175, 177, 179; 178/18.01, 18.02, 18.03, 18.04, 18.05, 19.01, 19.02, 19.03, 19.04

(56) References Cited

U.S. PATENT DOCUMENTS

| 4,954,967 A | 9/1990 | Takahashi |
| 5,995,083 A | 11/1999 | Sato et al. |

FOREIGN PATENT DOCUMENTS

| JP | 60-243730 | * 12/1985 | ............... 345/173 |
| JP | 61-164547 | 10/1986 | |
| JP | 03-049119 | 7/1991 | |
| JP | 10-149254 | 6/1998 | |
| JP | 11-105646 | 4/1999 | |

OTHER PUBLICATIONS

Official Action, Japanese Patent Office, Feb. 10, 2004, 4 pages and Partial English Translation thereof, 3 pages.

* cited by examiner

*Primary Examiner*—Henry N. Tran
*Assistant Examiner*—Jean Lesperance
(74) *Attorney, Agent, or Firm*—Eric J. Robinson; Robinson Intellectual Property Law Office, P.C.

(57) ABSTRACT

A groping operation apparatus is provided in which a command action can be specified by groping operation in reliable way. The groping operation apparatus includes a display device 11 having a display screen 25; a touch panel 17, which is provided on the display screen, for outputting the positional information indicating a contact point on the touch panel that is touched by the operator; specifying means 13 for specifying an action commanded by the operator touching the touch panel in accordance with the positional information; and control means 15 for outputting a control signal in accordance with an output of the specifying means. The specifying means detects the contact point moved from one end portion of the touch panel to another end portion, with the end portions located at four corner areas of the touch panel, on the basis of the positional information. The action commanded by the operator is specified from a movement start end portion and a movement termination end portion of the detected contact point.

10 Claims, 8 Drawing Sheets

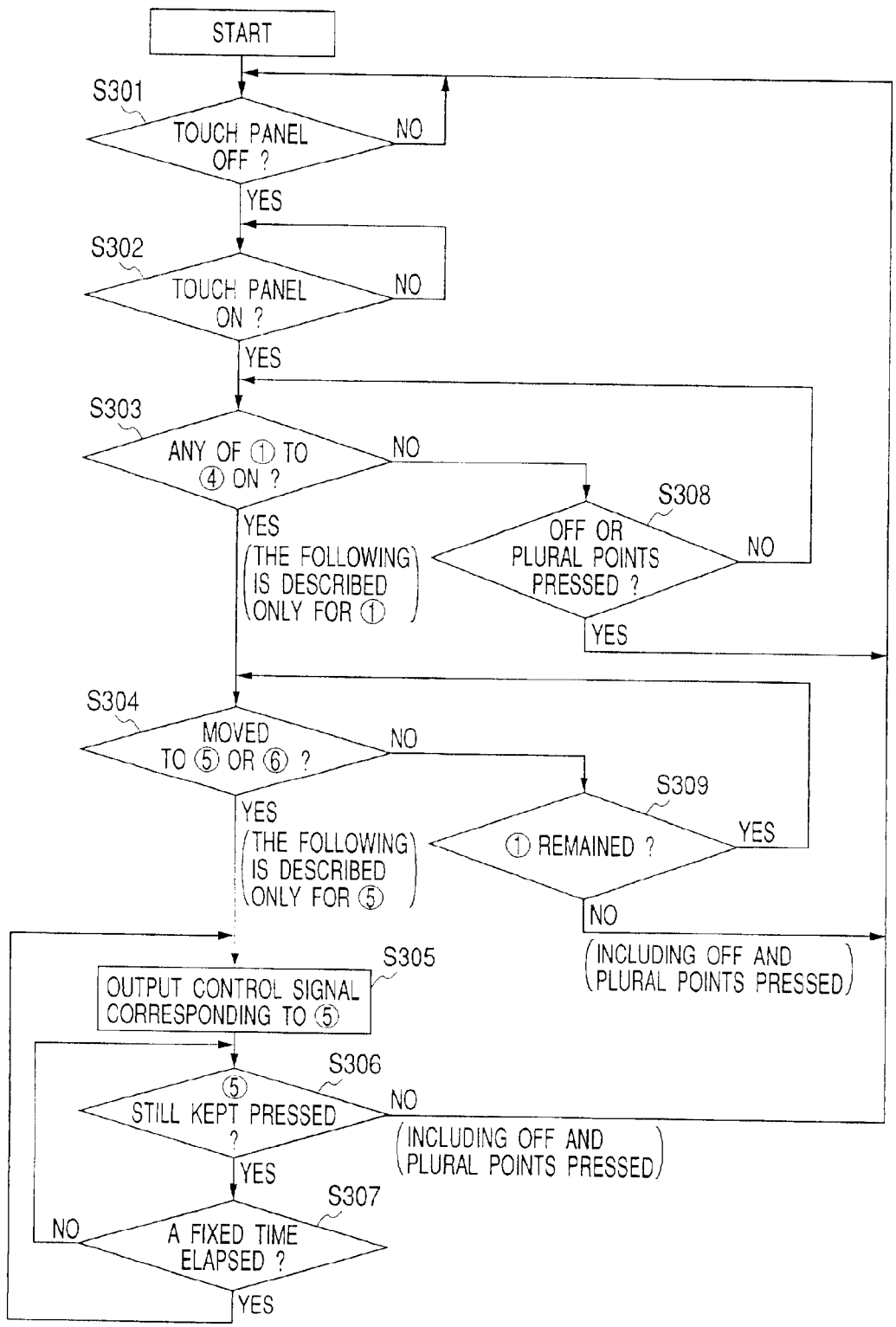

AT THE TIME OF CD-CH CONTROL

| OPERATION | ACTION |
|---|---|
| ① | TRACK DOWN |
| ② | TRACK UP |
| ③ | DISK DOWN |
| ④ | DISK UP |
| ⑤ ⑦ | VOLUME UP |
| ⑥ ⑧ | VOLUME DOWN |

AT THE TIME OF TUNER CONTROL

| OPERATION | ACTION |
|---|---|
| ① | SEEK DOWN |
| ② | SEEK UP |
| ③ | AM BAND SWITCH |
| ④ | FM BAND SWITCH |
| ⑤ ⑦ | VOLUME UP |
| ⑥ ⑧ | VOLUME DOWN |

GROPING OPERATION APPARATUS

TECHNICAL FIELD

The present invention relates to a groping operation apparatus for inputting a command or an instruction by touching a display screen of a display device with a finger or the like, and particularly to a groping operation apparatus that can be operated without seeing any screen.

BACKGROUND ART

Generally, a plurality of graphics (icons) each corresponding to one action are displayed on the display screen of the display device, and the operator selects a corresponding icon to command an action (hereinafter referred to as an object action). Conventionally, it was a common practice that a transparent touch sensor (touch panel) was installed on the front face of the display screen of the display device, so that the operator could command one action by selecting an icon displayed on the display screen and touching the icon on the touch sensor with a finger.

An operation switch for touching the icon is employed in the case of operating a navigation device or a car audio device while driving the car, for example, and has been already put to practical use.

FIG. 7 is a view showing a method for specifying an action in the conventional groping operation apparatus. In FIG. 7, there are four icons from object action 1 to object action 4 displayed on the display screen. When it is desired to command an object action 3, for example, the operator may touch an icon of the object action 3 on the touch panel (touch sensor) 17 with a finger to select the object action 3, so that a power switch of a specific audio apparatus can be turned on in accordance with an instruction of the object action 3.

However, since the display screen may shake within the moving car, it is difficult for the user to touch an icon indicating an object action correctly while driving the car. Therefore, the operator performs an operation while keeping an eye on the screen, which is a dangerous operation as the operation during the drive, and has difficulty in specifying the object action.

As means for solving such a problem, a device for informing the user of a selected icon (graphics) by uttering a sound that is different depending on the icon selected by the operator has been disclosed in Japanese Patent Application Laid-Open No. 4-309116 gazette.

However, with the device as disclosed in Japanese Patent Application Laid-Open No. 4-309116 gazette, there is the advantage of allowing for the selection operation without seeing the display screen, but if the selection operation of intent caused a failure, the selection operation had to be retried by confirming the failure in sound. Still, there was another problem that it took a lot of time to effect the selection operation in trial and error as described previously.

The present invention has been achieved in the light of the aforementioned problems, and it is an object of the invention to provide a groping operation apparatus that can specify an action to be commanded through the groping operation in reliable manner.

DISCLOSURE OF THE INVENTION

According to a first aspect of the present invention, there is provided a groping operation apparatus including: a display device having a display screen; a touch panel, which is provided on the display screen, for outputting the positional information indicating a contact point on the touch panel that is touched by the operator; specifying means for specifying an action commanded by the operator touching the touch panel in accordance with the positional information; and control means for outputting a control signal in accordance with an output of the specifying means, wherein the specifying means detects the contact point moved from one end portion of the touch panel to another end portion, with the end portions being located at four corner areas of the touch panel, on the basis of the positional information, and the action commanded by the operator is specified from a movement start end portion and a movement termination end portion of the detected contact point.

According to this invention, a contact start point and a contact termination point on the touch panel are limited to the four corner areas of the touch panel. Accordingly, after the operator knows the position on the display screen by grope, an action to be commanded can be correctly passed to the specifying means by moving a finger approximately on the touch panel without seeing the display screen. Since the four corner end portions can be groped and found relatively correctly in a sense of touch with hand, and the contact start point and the contact termination point cannot be detected at an area other than the four corner end portions, it is possible to suppress the possibility of misoperation even in the time of driving the car.

According to a second aspect of the invention, there is provided a groping operation apparatus including: a display device having a display screen; a touch panel, which is provided on the display screen, for outputting the positional information indicating a contact point on the touch panel that is touched by the operator; specifying means for specifying an action commanded by the operator touching the touch panel in accordance with the positional information; and control means for outputting a control signal in accordance with an output of the specifying means, wherein the specifying means detects the contact point moved from one end portion of the touch panel to another end portion, with the end portions being located at an almost central area and four corner areas of the touch panel, on the basis of the positional information, and the action commanded by the operator is specified from a movement start end portion and a movement termination end portion of the detected contact point.

According to this invention, a contact start point and a contact termination point on the touch panel are limited to the central area and four corner areas of the touch panel. The central area of the touch panel can be easily known from the shape of a peripheral portion in the display screen. Accordingly, the operator can pass an action to be commanded to the specifying means correctly by moving a finger on the touch panel approximately without seeing the display screen, after knowing the position of the display screen by grope. Since the five end portions can be groped and found relatively correctly in a sense of touch with hand, and the contact start point and the contact termination point cannot be detected at an area other than the five end portions, it is possible to suppress the possibility of misoperation while driving the car.

According to a third aspect of the invention, there is provided a groping operation apparatus including: a display device having a display screen; a touch panel, which is provided on the display screen, for outputting the positional information indicating a contact point on the touch panel that is touched by the operator; specifying means for specifying an action commanded by the operator touching the touch panel in accordance with the positional information; and control means for outputting a control signal in accordance with an output of the specifying means, wherein the specifying means detects the contact point moved along a peripheral portion of the display screen, on the basis of the positional information, and the action commanded by the operator is specified from a movement start position and a movement termination position of the detected contact point.

According to this invention, a contact start point and a contact termination point on the touch panel are limited to a predetermined movement area of the touch panel and detected. The movement area is the peripheral portion of the display screen, and the peripheral portion of the display screen is often provided with a member such as a frame, which can serve as a guide, when the contact point is moved, making it possible to move the contact point correctly. Even if there is no frame, the peripheral portion of the display screen can be correctly known in a sense of touch with hand.

Accordingly, the operator can pass an action to be commanded to the specifying means correctly by moving a finger on the touch panel along the peripheral portion of the display screen approximately without seeing the display screen, after knowing the position of the display screen by grope. Since the movement area is the peripheral portion of the display screen and the touch panel, the operator can know correctly the movement area in a sense of touch but not visually, so that it is possible to suppress the possibility of misoperation while driving the car.

According to a fourth aspect of the invention, there is provided the groping operation apparatus as defined in any one of the first to third inventions, wherein the specifying means specifies the action commanded by the operator from the number of movements of the detected contact point.

According to this invention, the action to be commanded can be passed to the specifying means correctly by moving a finger on the touch panel approximately without seeing any display screen in the same manner as the first and second inventions, and can be selected from among more kinds of actions by repeating the movement operation of the contact point.

Herein, the specifying means stores a movement to action correspondence table in which each action is associated with a combined content of the information of the movement start position and the movement termination position and the number of movements. And the specifying means specifies the instructed action from the analysis result of the movement of the contact point and the movement to action correspondence table, and supplies its result to the control device.

According to a fifth aspect of the invention, there is provided the groping operation apparatus as defined in any one of the first to fourth inventions, wherein the specifying means specifies the action commanded by the operator from the movement speed of the detected contact point.

According to this invention, the action to be commanded can be passed to the specifying means correctly by moving a finger on the touch panel approximately without seeing any display screen in the same manner as the first to third inventions, and can be selected from among more kinds of actions by combining the number of movements of the contact point and the movement speed of the contact point.

Herein, the specifying means stores a movement to action correspondence table in which each action is associated with a combined content of the information of the movement start position and the movement termination position, the information of the number of movements, and the information of the movement speed. And the specifying means specifies the instructed action from the analysis result of the movement of the contact point and the movement to action correspondence table, and supplies the specified result to the control device.

According to a sixth aspect of the invention, there is provided a groping operation apparatus including: a display device having a display screen; a touch panel, which is provided on the display screen, for outputting the positional information indicating a contact point on the touch panel that is touched by the operator; specifying means for specifying an action commanded by the operator touching the touch panel in accordance with the positional information; and control means for outputting a control signal in accordance with an output of the specifying means, wherein the specifying means detects the contact point moved on the touch panel on the basis of the positional information, calculates a movement direction of the contact point from a movement start position and a movement termination position of the detected contact point, and specifies the action commanded by the operator on the basis of the calculated movement direction.

According to this invention, a contact start point and a contact termination point on the touch panel are detected and stored to know the movement direction, but when the contact point is moved from left to right on the touch panel, for example, it does not matter whether the movement occurs on the top or the bottom of the touch panel 17. That is, the position in a vertical direction is not regarded.

The allowable movement direction is predetermined in the horizontal direction and the vertical direction, for example, and when the actual movement of the contact point is not precisely vertical or horizontal, it is judged to belong to either one of the horizontal and vertical movement directions that is closer to that actual movement direction.

Since the movement direction of the contact point is only detected in the predetermined direction, the operator can pass an action to be commanded to the specifying means correctly by moving a finger on the touch panel approximately without seeing any display screen, after knowing the position of the display screen by grope. Therefore, it is possible to suppress the possibility of misoperation while driving the car.

According to a seventh aspect of the invention, there is provided the groping operation apparatus as defined in the sixth invention, wherein the specifying means specifies the action commanded by the operator from the number of movements of the detected contact point.

According to this invention, the action to be commanded can be passed to the specifying means correctly by moving a finger on the touch panel approximately without seeing any display screen in the same manner as the sixth invention, and can be selected from among more kinds of actions by repeating the movement operation of the contact point.

According to an eighth aspect of the invention, there is provided the groping operation apparatus as defined in the sixth or seventh invention, wherein the specifying means specifies the action commanded by the operator from the movement speed of the detected contact point.

According to this invention, the action to be commanded can be passed to the specifying means correctly by moving a finger on the touch panel approximately without seeing any display screen in the same manner as the sixth invention, and can be selected from among more kinds of actions by combining the number of movements and the movement speed of the contact point.

According to a ninth aspect of the invention, there is provided a groping operation apparatus including: a display device having a display screen; a touch panel, which is provided on the display screen, for outputting the positional information indicating a contact point on the touch panel that is touched by the operator; specifying means for specifying an action commanded by the operator touching the touch panel in accordance with the positional information; and control means for outputting a control signal in accordance with an output of the specifying means, wherein in that the specifying means detects the contact point that is moved along a peripheral portion of the display screen to an end portion of the touch panel after being moved on the touch panel from an area other than the peripheral portion of the touch panel to the peripheral portion of the touch panel, with the end portions being located at four corner areas of the touch panel, on the basis of the positional information, and specifies the action commanded by the operator from a movement start position in the peripheral portion and a movement termination position of the detected contact point.

According to a tenth aspect of the invention, there is provided the groping operation apparatus as defined in the ninth invention, wherein the control means sends out a control signal in accordance with an output from the specifying means to the electrical device mounted on the vehicle.

According to an eleventh aspect of the invention, there is provided the groping operation apparatus as defined in the tenth invention, wherein the control means sends out a control signal in accordance with an output from the specifying means to the acoustic device mounted on the vehicle to adjust the sound volume of the acoustic device.

According to a twelfth aspect of the invention, there is provided the groping operation apparatus as defined in the tenth invention, wherein the control means sends out a control signal in accordance with an output from the specifying means to the acoustic device mounted on the vehicle to instruct a track number of the recording medium which the acoustic device records or reproduces.

According to a thirteenth aspect of the invention, there is provided the groping operation apparatus as defined in any one of the ninth to twelfth inventions, wherein when the movement of the contact point in the peripheral portion of the touch panel occurs in a longitudinal direction of the touch panel, the control means outputs a control signal for increasing or decreasing a set value of the electrical device connected to the groping operation apparatus.

BRIEF DESCRIPTION OF THE DRAWINGS

FIG. 2C is a simplified flowchart showing a part of a procedure with an operation for the groping operation apparatus of the invention;

BEST MODE FOR CARRYING OUT THE INVENTION

Figure 2A:
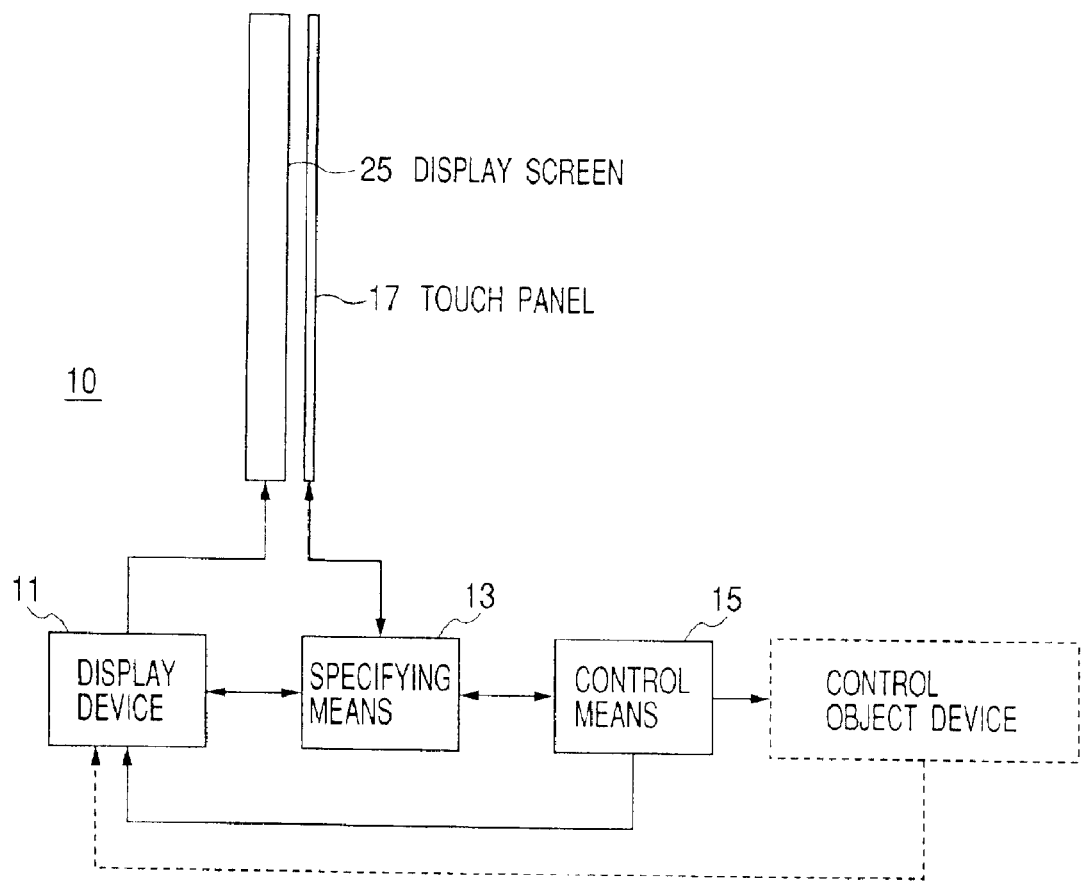
FIG. 2A is a block diagram of the groping operation apparatus according to the invention.
Figure 2B:
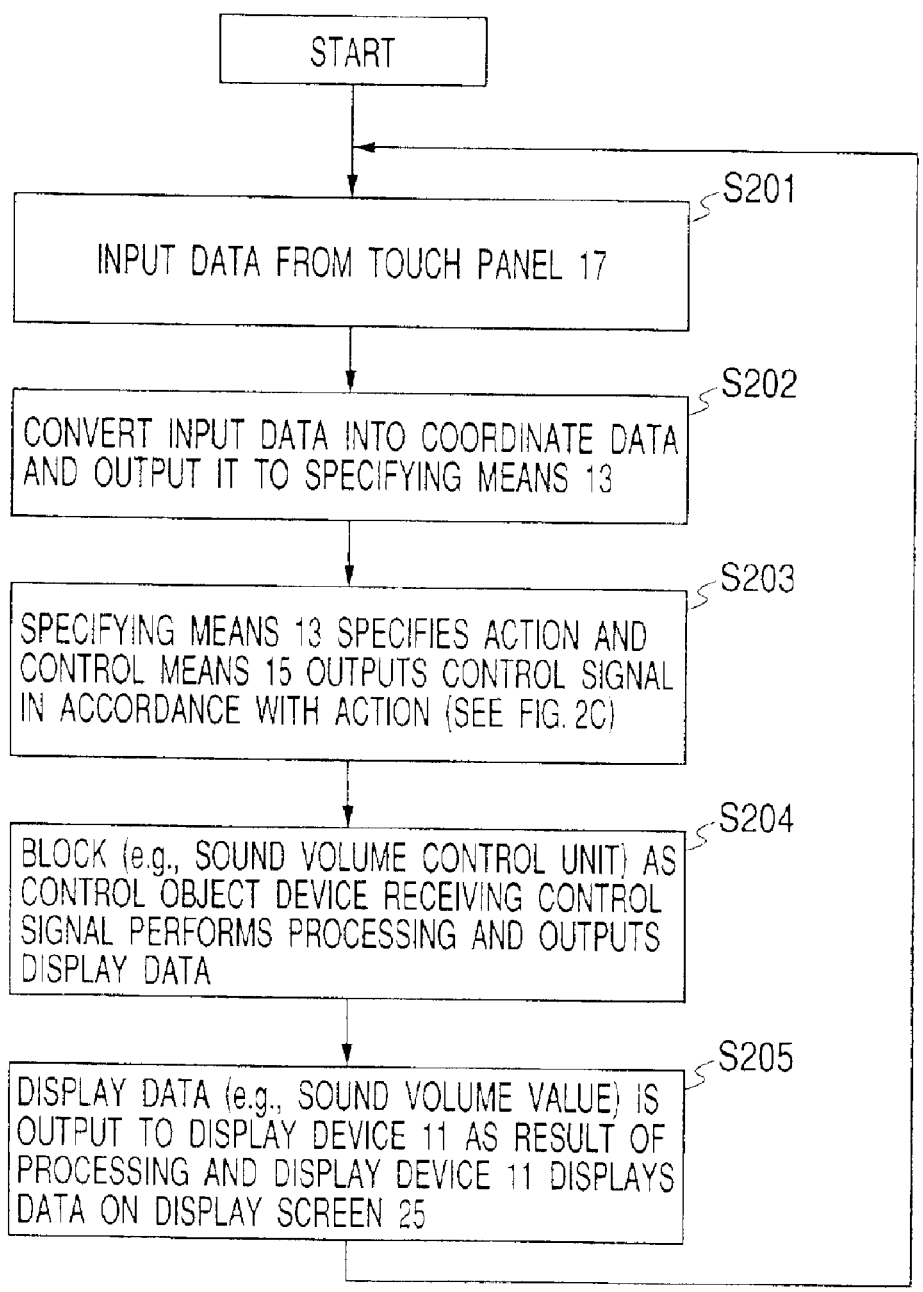
FIG. 2B is a schematic flowchart showing a procedure of the groping operation apparatus as shown in FIG. 2A, including a procedure of outputting a control signal to a control object device and inputting a display data from a control object device.

FIG. 2A is a block diagram of a groping operation apparatus according to the invention, and FIG. 2B is a flowchart schematically showing a procedure of the groping operation apparatus. As shown in FIGS. 2A and 2B, a groping operation apparatus 10 comprises a display device 11 having a display screen 25, a touch panel 17 provided on the display screen 25, specifying means 13 for specifying an action commanded by a operator's touching the touch panel 17, and control means 15 for outputting a control signal in accordance with an output of the specifying means 13.

The touch panel 17 is provided on the display screen 25. When the operator touches the touch panel 17 in the groping operation apparatus 10, the data is input from the touch panel 17 (S201). The input data is converted into the coordinate data (S202), and the coordinate data, or the positional information indicating the contact point on the touch panel, is output to the specifying means 13.

The specifying means 13 specifies an action commanded by the operator touching the touch panel 17 in accordance with the positional information, and outputs it to the control means 15. The control means 15 supplies the control information to a control object device such as a car audio in accordance with the specified action (S203). This control object device performs a corresponding processing on the basis of the control information, and outputs the display data to the display device 11 (as indicated by the arrow of the broken line in FIG. 2A) (S204). The display device 11 outputs the display data to the display screen 25 to display the display data (S205). Also, the control means 15 controls the display device 11 with the display contents and the display timing and the specifying means 13 with the contact point or the movement detection start and the movement detection termination. If the action instructed by the operator is specified by the specifying means 13, its result is sent to the display device 11, and displayed on the display screen 25. In this case, the operator may also recognize the specified action in voice. If the action instructed by the operator is not specified by the specifying means 13, the alarm sound is produced by the loudspeaker, and its result is sent to the display device 11 and displayed on the display screen 25.

Figures 6A, 6B, 6C:
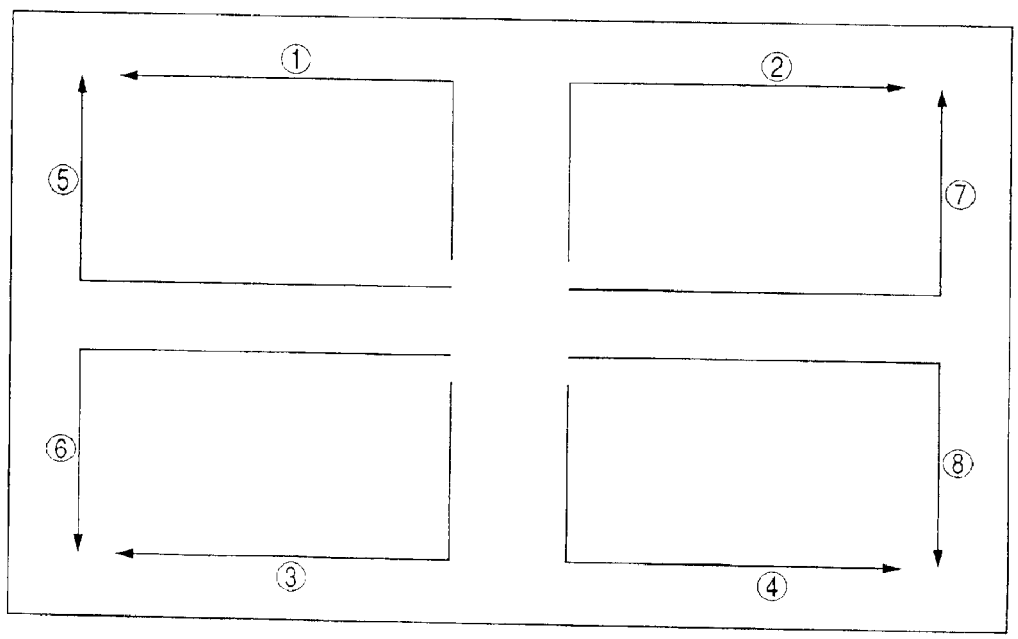
FIGS. 6A and 6B are each an example of a movement to action correspondence table stored in specifying means in the groping operation apparatus of the invention.
FIG. 6C is a view showing the movement direction of FIGS. 6A and 6B.
Figure 7:
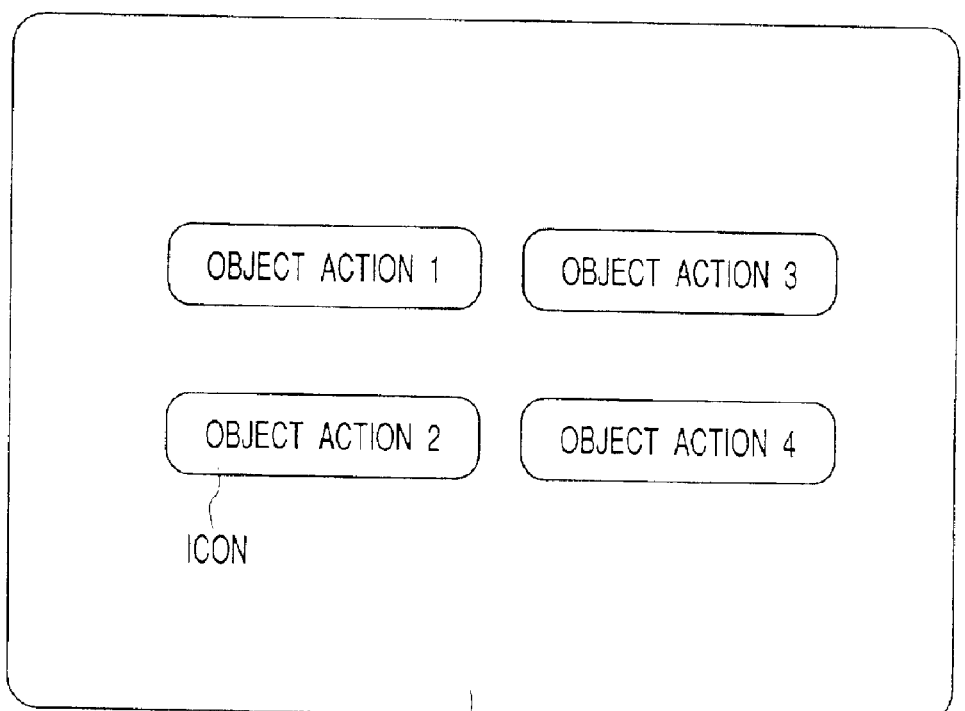
FIG. 7 is a view showing a method for specifying the action in the conventional groping operation apparatus.

Further, the specifying means 13 stores a movement to action correspondence table in which each action is associated with a combined content of the information of the movement start position and the movement termination position, the number of movements, and the movement speed. And the specifying means 13 specifies the instructed action by the operator from the analysis result of the movement of the contact point and the movement to action correspondence table, and supplies its result to the control means 15. Herein, one example of the movement to action correspondence table is shown in FIGS. 6A and 6B, and the movement direction as indicated in the table is shown in FIG. 6C. In FIG. 6A, the movement operation and the action are shown at the time of the CD-CH control. For example, if an operation ① is performed as shown in FIG. 6C, the track down is specified as the action. Also, in FIG. 6B, the movement operation and the action are shown at the time of the tuner control. For example, if an operation ⑤ ⑦ is performed as shown in FIG. 6C, the volume up is specified as the action.

Figure 2D:
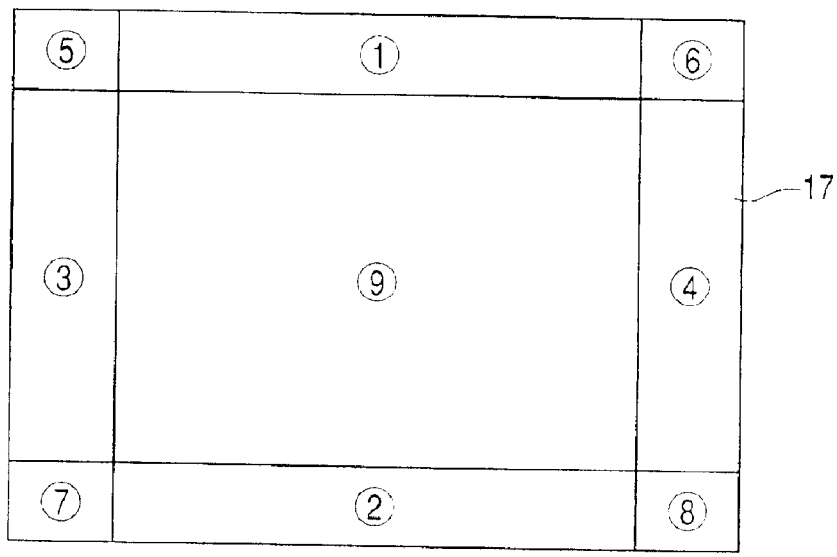
FIG. 2D is a diagram for explaining a touch position of a touch panel 17 in the operation as indicated in the simplified flowchart of FIG. 2C.

Referring now to FIGS. 2B and 2C, a part of the procedure for the groping operation apparatus of the invention with an operation will be briefly described below. As shown in FIG. 2C, if the operator turns the touch panel 17 from off to on (S301, S302), it is determined whether or not any of the positions ① to ④ (see FIG. 2D) is touched (S303). If position ① is touched, it is then determined whether or not position ⑤ or ⑥ is touched (S304). If position ⑤ is touched, a control signal corresponding to position ⑤ is output from the control means 15 to a control object device. And after outputting the control signal, the touch condition of position ⑤ is judged (S306). If the touch condition is maintained for a fixed time (Yes in S307), the control signal corresponding to position ⑤ is output again, while if the touch condition is released before the elapse of the fixed time (No in S307), the procedure returns to S306. In case of No in S303, it is determined whether or not the touch panel is turned off or a multiplicity of positions are touched (S308). Then, the procedure returns to S303 if No in S308, or returns to S301 if Yes in S308. Also, in case of No in S304, it is determined whether or not the condition of position ① is kept (S309). The procedure returns to S304 if Yes in S309, or returns to S301, if No in S309, including the condition where the touch panel is off or a multiplicity of positions are touched. Note that the processing following S303 in FIG. 2C is only shown in the case of position ① for the simpler explanation, because the subsequent processing in each case of positions ① to ④ is considered to be the same. Similarly, the processing following S304 is only shown in the case of position ⑤.

Figure 1:
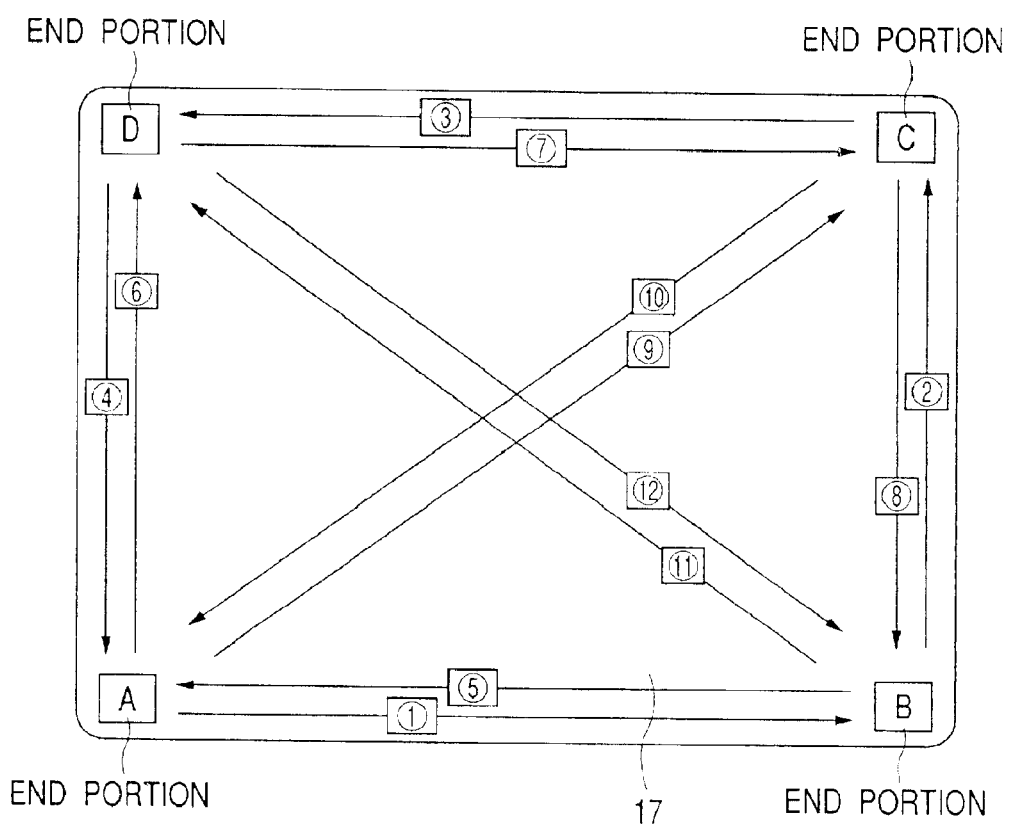
FIG. 1 is a view showing a method for specifying an action in a groping operation apparatus according to a first embodiment of the present invention.

Referring now to FIGS. 1 and 2A–2D, the groping operation apparatus according to the first embodiment of the invention will be described below. FIG. 1 is a view showing a method for specifying an action in the groping operation apparatus according to the first embodiment of the invention. In FIG. 1, the end portions A, B, C and D are set up at four corners of the touch panel 17. The four end portions serve to indicate the corner of the panel, the area of each end portion being set wide enough. And if the operator moves a finger on the touch panel 17 while touching the touch panel with the finger, the specifying means 13 judges that the contact point has been moved from the positional information output from the touch panel 17. Herein, the point at which the movement of the contact point is started, or the movement start position, and the point at which the movement of the contact point is terminated, or the movement termination position, are judged to belong to the closest end portion among the four end portions, on the basis of the positional information output from the touch panel 17, and stored as the movement start end portion and the movement termination end portion in the specifying means 13, respectively.

For example, when the contact point is moved from end portion A to end portion B, as shown in FIG. 1, it is judged that the first object action is commanded by the operator. When the contact point is moved from end portion C to end portion B, it is judged that the eighth object action is commanded by the operator. In this way, the first to twelfth object actions are specified in accordance with the fact that the contact point is moved from which end portion to which end portion.

As described previously, the end portions are set up at four corners of the touch panel 17, in which each end portion is set to be a wide area having a predetermined area, but not a narrow area, and when the movement of the contact point is started or terminated near the area, the start point or termination point is judged to be within the closest end portion.

Also, a total of five areas, including the four corner areas of the touch panel as the end portions, and a central area of the touch panel as one end portion, may be defined as the end portions, in which case one object action can be commanded from among more object actions to be instructed.

The specifying means 13 stores the time taken for the movement, and the number of movements. And the object action to be commanded (selected) may be assigned in accordance with the number of movements of the contact point, whereby the number of object actions to be selected can be increased above 12. Also, the object action to be commanded (selected) may be assigned, depending on whether the movement speed of the contact point is fast or slow, whereby the number of object actions to be selected can be increased above 12. Further, the object action to be commanded (selected) may be assigned in accordance with the number of movements and the movement speed of the contact point, whereby the number of object actions to be selected can be more increased.

Figure 3:
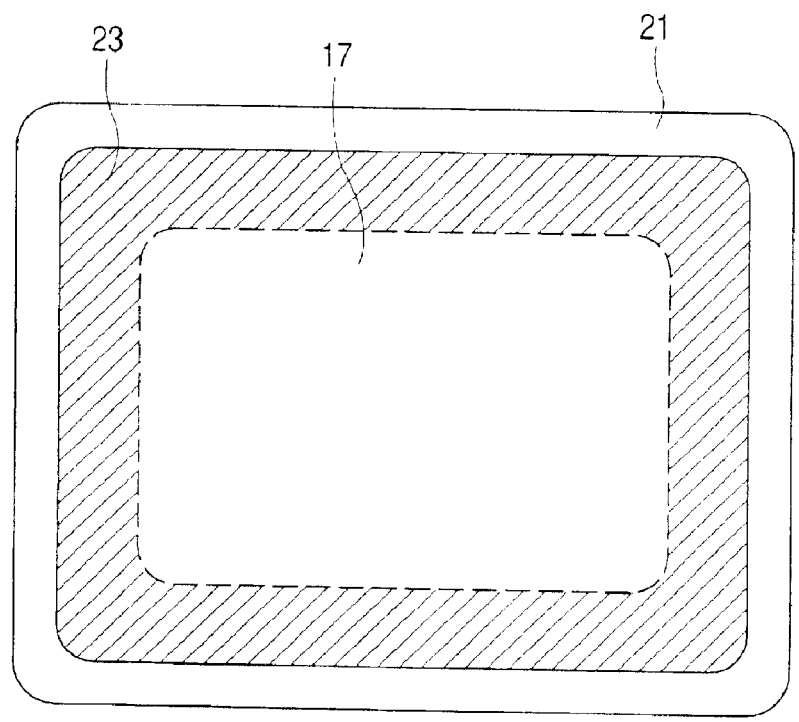
FIG. 3 is a view showing a movement area of a contact point in a groping operation apparatus according to a second embodiment of the invention.

A groping operation apparatus according to the second embodiment of the invention will be described below with reference to FIGS. 3 and 4. FIG. 3 is a view showing the movement area of the contact point in the groping operation apparatus according to the second embodiment of the invention. The block diagram of the groping operation apparatus according to the second embodiment is the same as shown in FIG. 2.

As shown in FIG. 3, a marginal portion 21 is located outside the touch panel 17, and is composed of a frame provided outside the display screen 25. A peripheral portion of the touch panel 17 is a movement area 23 as indicated by the slanting line, and the movement of the contact point occurs within the movement area. The movement area 23 is located about 2 cm inside from the outermost periphery of the touch panel 17, and the operator can move the contact point within the movement area 23 easily and correctly by moving a finger along the marginal portion 21 because the marginal portion 21 serves as a guide, even while driving the car.

That is, the groping operation apparatus according to the second embodiment of the invention is the same as that of the first embodiment, and comprises a display device 11 having a display screen 25, a touch panel 17, which is provided on the display screen 25, for outputting the positional information indicating the contact point on the touch panel, specifying means 13 for specifying an action commanded by the operator touching the touch panel, and control means 15 for outputting a control signal in accordance with an output of the specifying means.

However, the groping operation apparatus according to the second embodiment of the invention is different from that of the first embodiment in that the contact point moved along the peripheral portion of the display screen 25 is detected in the specifying means 13 on the basis of the positional information output from the touch panel 17, and the object action commanded by the operator is specified from the movement start position and the movement termination position of the detected contact point.

Figure 4:
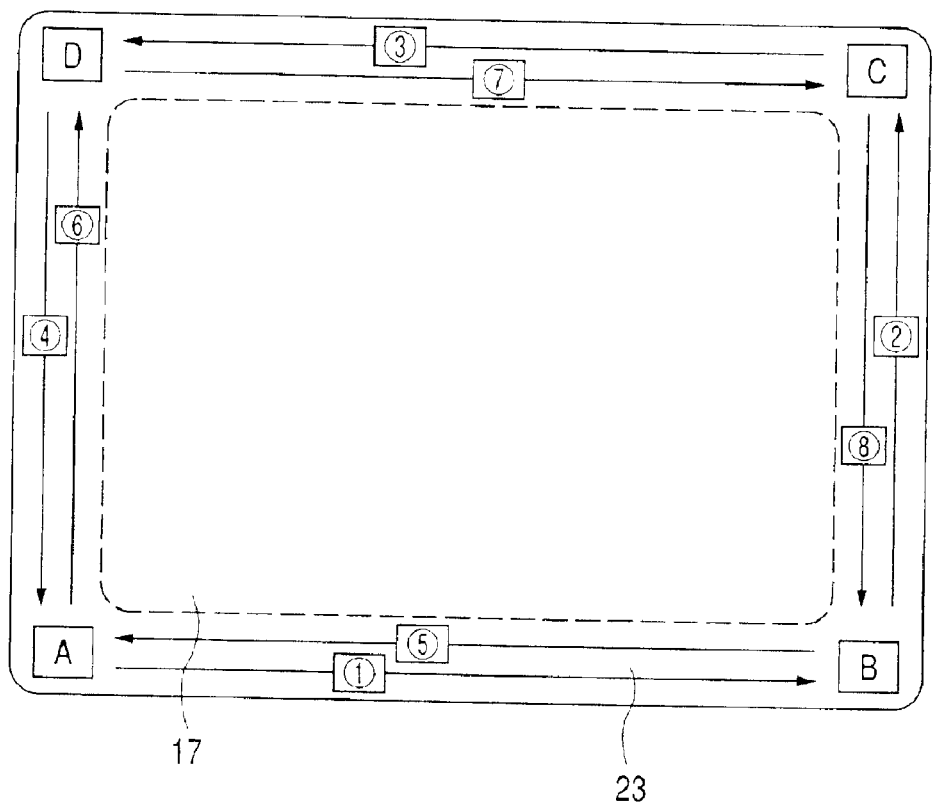
FIG. 4 is a view showing a method for specifying an action in the groping operation apparatus according to the second embodiment of the invention.

FIG. 4 is a view showing a method for specifying an action in the groping operation apparatus according to the second embodiment of the invention. As shown in FIG. 4, the end portions A, B, C and D are set up at four corners of the touch panel 17 in the same manner as in the first embodiment. For example, when the contact point is moved from end portion A to end portion B, it is judged by the specifying means 13 that the action 1 is commanded by the operator. When the contact point is moved from end portion B to end portion A, it is judged by the specifying means 13 that the action 5 is commanded by the operator. As shown in FIG. 4, in the case where the movement start position or movement termination position is set at any of the four corner end portions of the touch panel 17, one object action among actions 1 to 8 can be commanded.

The movement of the contact point is limited within the movement area 23. However, the movement start position and the movement termination potion of the contact point are not limited to the four end portions, but the movement start position or movement termination position of the contact point can be set between end portion A and end portion B, for example. Thereby, the number of object actions to be selected (commanded) can be increased above 8. Herein, the movement of the contact point is detected in the specifying means 13 on the basis of the positional information output from the touch panel 17, the information as to the movement start position and the movement termination position is stored in the specifying means 13, and the object action to be commanded by the operator can be specified from the information as to the movement start position and the movement termination position.

The specifying means 13 stores the time taken for the movement of the contact point, and the number of movements of the contact point. And the object action to be commanded (selected) may be assigned in accordance with the number of movements of the contact point, whereby one object action can be selected (commanded) from among more object actions. Also, the object action to be commanded (selected) may be assigned, depending on whether the movement speed of the contact point is fast or slow, whereby the number of object actions to be selected can be more increased. Further, the object action to be commanded (selected) may be assigned in accordance with the number of movements and the movement speed of the contact point, whereby the number of object actions to be selected can be more increased.

Figure 5:
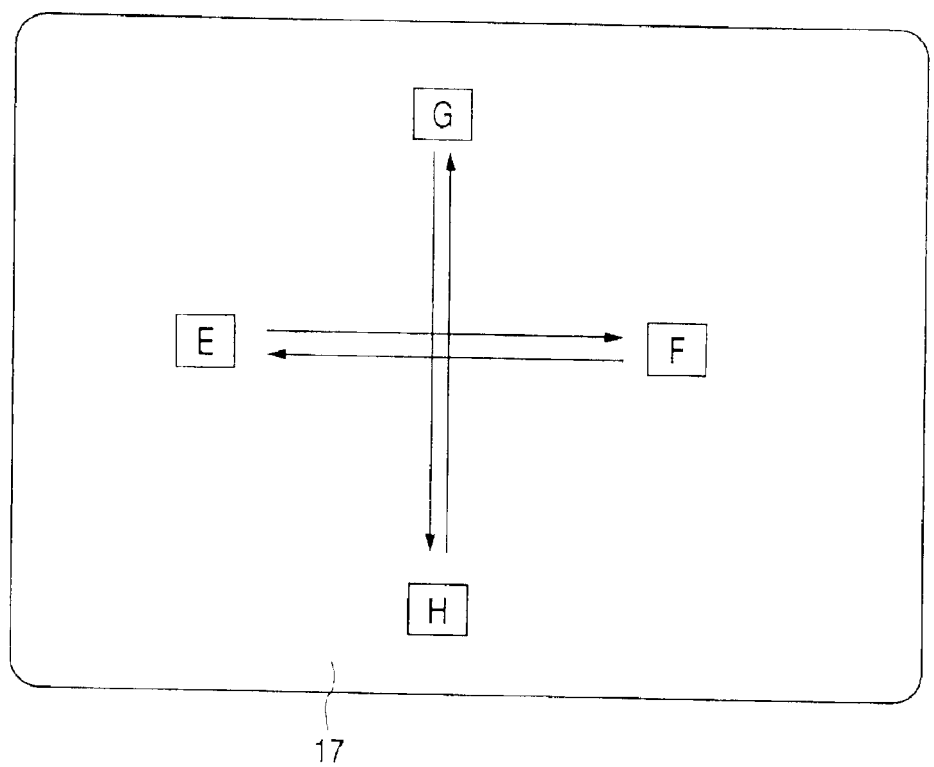
FIG. 5 is a view showing a method for specifying an action in a groping operation apparatus according to a third embodiment of the invention.

A groping operation apparatus according to the third embodiment of the invention will be described below with reference to FIG. 5. FIG. 5 is a view showing a method for specifying an action in the groping operation apparatus according to the third embodiment of the invention. The block diagram of the groping operation apparatus according to the third embodiment is the same as shown in FIG. 2.

As shown in FIG. 5, the movement direction of the contact point is detected in the groping operation apparatus according to the third embodiment of the invention, in which an object action corresponding to the detected direction is recognized as to be the object action selected (commanded) by the operator. Herein, since the movement direction of the contact point is detected, the operator only needs to move a finger without worrying about the absolute position on the touch panel, whereby the operator can command the object action easily and correctly, even while driving the car.

That is, in the groping operation apparatus according to the third embodiment of the invention, the movement of the contact point is not limited within the movement area 23 as in the second embodiment. Also, the movement start position and the movement termination potion of the contact point are obtained from the positional information output from the touch panel 17, and stored in the specifying means 13.

In the specifying means 13, the movement direction of the contact point is detected from the information of the movement start position and the movement termination position of the contact, in which one object action is selected from among the predetermined object actions corresponding to the movement direction. For example, if the action 1 is defined for the movement from left to right, the action 2 for the movement from right to left, the action 3 for the movement from top to bottom, and the action 4 for the movement from bottom to top, one object action can be selected (commanded) from among four object actions.

The specifying means 13 stores the time taken for the movement of the contact point, and the number of movements of the contact point. And the object action to be commanded (selected) may be assigned in accordance with the movement direction and the number of movements of the contact point, whereby the number of object actions to be selected can be increased above 4. Also, the object action to be commanded (selected) may be assigned in accordance with the movement direction, the number of movements, and the movement speed of the contact point, whereby the number of object actions to be selected can be more increased.

When the movement of the contact point is detected by the specifying means 13, the movement of the contact point is recognized to be started at a moment when the operator touches the touch panel 17 with a finger, and the movement is judged to be terminated at a moment when the finger moving on the touch panel is left from the touch panel. When the next movement is started immediately after that, for example, within two seconds, the movement is judged to be not by a new command, but one command including the previous movement. Accordingly, when the operator makes one command by repeating the movement of the contact point, the next movement action is started within two seconds after one movement action, and when the next command is issued after one command is terminated, the next command is started after the elapse of two seconds or more from the previous command.

Also, when the movement of the contact point is detected by the specifying means 13, the movement of the contact point may be recognized to be started at a moment when the operator's finger touches the touch panel 17 and is moved, and the movement may be judged to be terminated at a moment when the movement of the finger is stopped.

As described above, with the groping operation apparatus of the invention, if the operator gropes the position of the display screen by hand and moves a finger on the touch panel without seeing the display screen, the object action can be commanded. Therefore, the operator can easily control the device connected to this groping operation apparatus, even while driving the car, for example.

A groping operation apparatus according to the fourth embodiment of the invention will be described below, exemplifying an operation panel for the car-mounted electrical device employing the groping operation apparatus.

When the operator who is driving the car operates the electrical device mounted on the car, the operator touches the touch panel with a finger without seeing the display screen. Assuming that the firstly touched area is other than the movement area 23 as shown in FIG. 3, the operator firstly moves the finger to the peripheral portion (movement area) of the touch panel 17. This operation can be easily effected because the marginal portion 21 outside the movement area 23 serves as a stopper. And the operator moves the finger to any of the end portions as indicated by A, B, C and D in FIG. 4, while tracing the movement area 23 (peripheral portion of the touch panel) with the finger.

An operation of the operator is detected by the groping operation apparatus 10 in the following way. Then, a control signal is sent from the control means 15 to the car-mounted acoustic device connected to the groping operation apparatus 10.

That is, the specifying means 13 detects the contact point being moved along the movement area (peripheral portion) 23 of the display screen to the end portion of the touch panel, after being moved from an area other than the movement area (peripheral portion) 23 of the touch panel 17 to the peripheral portion of the touch panel, on the basis of the positional information, with end portions being located at four corner areas A, B, C and D of the touch panel. And an action commanded by the operator is specified from the movement start position in the peripheral portion and the movement termination position of the detected contact point.

The control means 15 sends out a control signal in accordance with an output from the specifying means 13, for example, a control signal for adjusting the sound volume to increase or decrease the sound volume of the acoustic device, to the acoustic device mounted on the car. In this case, the sound volume is adjusted by the time for which any of the four corners is pressed, as indicated at S306 and S307 in FIG. 2C. That is, a volume one step command is output as the control signal, and thereafter if the same area is kept pressed even after the elapse of 500 ms, the volume one step up command is output again. Note that some actions such as attenuation ON hardly change even though the control signal is output repeatedly, in which the control signal may be output only once even though any of the four corners is kept pressed.

In the case of controlling the acoustic device by sending a control signal to the acoustic device, the control means 15 outputs the control signal for increasing or decreasing the set value of the electrical device connected to the groping operation apparatus 10, when the movement of the contact point in the peripheral portion 23 of the touch panel 17 occurs in the longitudinal direction of the touch panel 17, for example.

Particularly for the device for outputting the voice, when the movement of the contact point is made upwards on the touch panel, the volume is increased, while when the movement of the contact point is made downwards on the touch panel, the volume is decreased. Hence, the operator can perform the operation in a sense that the touch panel is an operation panel for the acoustic device.

Also, for the device for reproducing the recording medium to output the voice, the control means 15 sends out a control signal in accordance with the selected command to the acoustic device connected to the groping operation apparatus 10, thereby instructing a track number of the recording medium on which the acoustic device records or reproduces.

What is claimed is:

1. A groping operation apparatus, comprising:
a display device having a display screen;
a touch panel, which is provided on the display screen, for outputting the positional information indicating a contact point on the touch panel that is touched by the operator;
specifying means for specifying an action commanded by the operator touching the touch panel in accordance with the positional information; and
control means for outputting a control signal in accordance with an output of said specifying means,
wherein in that said specifying means detects said contact point moved from one end portion of said touch panel to another end portion, with the end portions located at four corner areas of said touch panel, on the basis of said positional information, and said action commanded by said operator is specified from a movement start end portion and a movement termination end portion of said detected contact point, so that the operator can specify the action without seeing the screen by using the movement between the two end portions.

2. The groping operation apparatus according to claim 1, wherein said specifying means specifies said action commanded by the operator from the number of movements of the detected contact point.

3. The groping operation apparatus according to claim 1, wherein said specifying means specifies said action commanded by the operator from the movement speed of the detected contact point.

4. A groping operation apparatus, comprising:
a display device having a display screen;
a touch panel, which is provided on said display screen, for outputting the positional information indicating a contact point on said touch panel that is touched by the operator;
specifying means for specifying an action commanded by the operator touching said touch panel in accordance with the positional information; and
control means for outputting a control signal in accordance with an output of said specifying means,
wherein said specifying means detects said contact point moved from one end portion of said touch panel to another end portion, with the end portions located at an almost central area and four corner areas of said touch panel, on the basis of said positional information, and said action commanded by said operator is specified from a movement start end portion and a movement termination end portion of said detected contact point, so that the operator can specify the action without seeing the screen by using the movement between the two end portions.

5. A groping operation apparatus, comprising:
a display device having a display screen;
a touch panel, which is provided on said display screen, for outputting the positional information indicating a contact point on said touch panel that is touched by the operator;
specifying means for specifying an action commanded by the operator touching said touch panel in accordance with the positional information; and
control means for outputting a control signal in accordance with an output of said specifying means,
wherein said specifying means detects said contact point moved along a peripheral portion of said display screen, on the basis of said positional information, and said action commanded by said operator is specified from a movement start position and a movement termination position of said detected contact point, so that the operator can specify the action without seeing the screen by using the movement between the start position and the termination position.

6. A groping operation apparatus, comprising:

a display device having a display screen;

a touch panel, which is provided on said display screen, for outputting the positional information indicating a contact point on said touch panel that is touched by the operator;

specifying means for specifying an action commanded by the operator touching said touch panel in accordance with the positional information; and control means for outputting a control signal in accordance with an output of said specifying means, wherein said specifying means detects said contact point that is moved along a peripheral portion of said display screen to an end portion of said touch panel after being moved on said touch panel from an area other than the peripheral portion of said touch panel to the peripheral portion of said touch panel, with the end portions located at four corner areas of said touch panel, on the basis of said positional information, and specifies the action commanded by the operator from a movement start position in said peripheral portion and a movement termination position of said detected contact point, so that the operator can specify the action without seeing the screen by using the movement between the start position and the termination position.

7. The groping operation apparatus according to claim 6, wherein said control means sends out a control signal in accordance with an output from said specifying means to an electrical device mounted on a vehicle.

8. The groping operation apparatus according to claim 7, wherein said control means sends out a control signal in accordance with an output from said specifying means to an acoustic device mounted on a vehicle to adjust the sound volume for the acoustic device.

9. The groping operation apparatus according to claim 7, wherein said control means sends out a control signal in accordance with an output from said specifying means to an acoustic device mounted on a vehicle to instruct a track number of the recording medium on which the acoustic device records or reproduces.

10. The groping operation apparatus according to claim 6, wherein when the movement of the contact point in the peripheral portion of said touch panel occurs in a longitudinal direction of said touch panel, said control means outputs a control signal for increasing or decreasing a set value of the electrical device connected to said groping operation apparatus.

* * * * *